United States Patent [19]

Campbell

[11] 4,051,475
[45] Sept. 27, 1977

[54] RADIO RECEIVER ISOLATION SYSTEM

[75] Inventor: Donn V. Campbell, Eatontown, N.J.

[73] Assignee: The United States of America as represented by the Secretary of the Army, Washington, D.C.

[21] Appl. No.: 707,166

[22] Filed: July 21, 1976

[51] Int. Cl.² .................................................. H04L 5/06
[52] U.S. Cl. ............................................ 343/180; 333/11; 343/852; 325/15; 325/22
[58] Field of Search ............... 343/176, 180, 852, 200, 343/207; 333/11; 325/179, 180, 129, 21, 15, 22, 23; 179/2 C, 15 FD

[56] References Cited
U.S. PATENT DOCUMENTS

| 2,107,025 | 2/1938 | Buschbeck | 325/179 |
| 2,424,156 | 7/1947 | Espley | 343/180 |
| 2,724,804 | 11/1955 | Storch | 325/129 |
| 2,938,999 | 5/1960 | Etter | 325/180 |
| 3,479,617 | 11/1969 | Rhyne | 333/11 |
| 3,781,684 | 12/1973 | Inslerman | 325/21 |

Primary Examiner—Robert L. Griffin
Assistant Examiner—Michael A. Masinick
Attorney, Agent, or Firm—Nathan Edelberg; Jeremiah G. Murray; Edward Goldberg

[57] ABSTRACT

An isolation system adapted to permit simultaneous operation of at least two colocated radio transceivers operating at different frequencies into at least one antenna by means of a single hybrid transformer having said at least one antenna coupled to one conjugate port, at least one broadband impedance simulator coupled to the other conjugate port and wherein said transceivers are respectively coupled to sum and difference ports of the hybrid transformer.

10 Claims, 4 Drawing Figures

RADIO RECEIVER ISOLATION SYSTEM

The invention described herein may be manufactured and used by or for the Government for governmental purposes without the payment of any royalties thereon or therefor.

BACKGROUND OF THE INVENTION

This invention relates generally to communications apparatus and more particularly to an antenna system employing a hybrid transformer to achieve isolation between radio transceivers operating on different radio frequencies.

The present trend in radio communications is to permit two or more colocated parties to communicate simultaneously on separate radio transceivers. For example, several air traffic controllers located within a small control tower must be able to communicate with their respective aircraft. Likewise, an aircraft may employ several different radios and antennas for communicatons which must be operable simultaneously. Still another application involves that of relaying or retransmission of radio signals in which an incoming signal is received at one frequency, demodulated and retransmitted at another frequency.

The communications systems require the use of special antenna systems which are adapted to prevent locally generated strong transmitted radio signals from interferring with simultaneously received weak incoming radio signals. Even if the transmitting and receiving frequencies are widely diverse, interference may still nevertheless be severe. In some cases where sufficient space is available, the transmitting antenna is installed a relatively far distance from the receiving antenna so that interference is diminished to an acceptable level.

In the case of airborne radio systems or in small portable, transportable or vehicular systems, it is not possible to widely space the antennas and consequently it becomes extremely difficult to control and minimize cross-talk interference between colocated transmitters and receivers. Where the wavelength is short, it has been found possible to effect reduced interaction of transmitting and receiving antennas by arranging them in colinear relationship; however, where the wavelength is not short it is necessary to resort to other methods for controlling interference.

One known method for reducing cross-talk interference is by the use of one or more four port hybrid transformers. Such apparatus is taught, for example, in U.S. Pat. No. 3,518,684 entitled "Duplex Antenna Systems for Aircraft Transceivers," H. Brueckmann, June 30, 1970, and U.S. Pat. No. 3,781,684, entitled "Single Antenna Repeater System Utilizing Hybrid Transformers," H.E. Inslerman, Dec. 25, 1973, both patents of which are assigned to the assignee of the present invention.

SUMMARY

Briefly, the subject invention is directed to an improved radio transceiver isolation system for a pair of radio transceivers operating at respective different frequencies and comprises a single hybrid transformer having a pair of conjugate ports and a sum and a difference port with the transceivers being coupled respectively to the sum and difference ports. At least one antenna is coupled to one conjugate port while a load impedance substantially identical to the impedance of the antenna is coupled to the opposite conjugate port. In the preferred embodiment, the load impedance comprises a first impedance simulator for said antenna operating at a first operating frequency connected in series to a filter circuit adapted to pass the first operating frequency, the operating frequency of one transceiver, but adapted to reject a second operating frequency, the operating frequency of the other transceiver, and a second impedance simulator matching the impedance of the antenna operable at the second operating frequency connected in series with a filter network adapted to pass the second operating frequency while rejecting the first operating frequency.

DESCRIPTION OF THE PREFERRED EMBODIMENTS

In any antenna system employing a hybrid transformer to achieve isolation between radio transceivers, it is important to note that the amount of isolation which can be achieved primarily depends upon two factors, the quality of the hybrid transformer itself, and the degree of mismatch between the two load impedances connected to the hybrid, It has been found that the isolation between the sum port and the difference port of a high quality hybrid transformer reaches its maximum value when the load impedances connected to the other two ports (conjugate ports) are identical. If the impedances are complex, that is having real and imaginary components, then the real components must be equal and the imaginary components must be equal in order to effect a desired balanced condition of the hybrid.

It can be shown that if the load impedance differ by as little as 5 percent, the corresponding isolation between the sum and difference ports of a high quality hybrid will then be in the order of 37dB. If the load impedances differ by 10 percent, the corresponding isolation will then be approximately 30dB. Thus in order to make full use of the isolation capabilities of a high quality, hybrid transformer, it becomes necessary that two load impedances be substantially matched to each other, at least within a few percent.

When one of the load impedances connected to the hybrid is for example an antenna, it is then necessary that the other load impedance be identical or at least within a few percent of the antenna's operating impedance. When the system operates over a narrow frequency range, it is not too difficult to achieve the desired balance condition. However, when the system is required to function over a wide range of frequencies, it may then be exceedingly difficult to achieve balance because the antenna inherently does not have the identical impedance at each frequency of operation.

Figure 1:
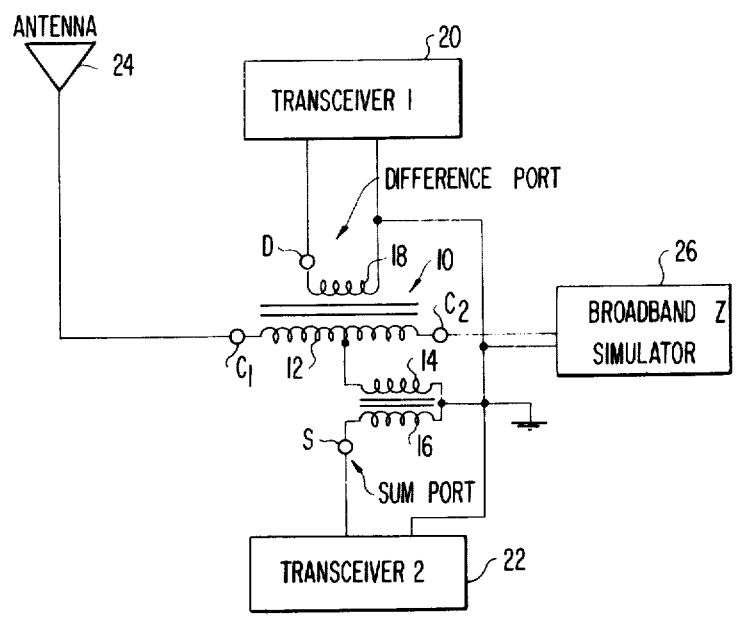
FIG. 1 is a circuit block diagram illustrative of a first embodiment of the subject invention.

Referring now more specifically to the subject invention, attention is first directed to the embodiment shown in FIG. 1 which broadly sets forth the inventive concept. In FIG. 1, reference numeral 10 denotes a broadband hybrid transformer including a center tapped winding 12, the ends of which are respectively connected to a pair of conjugate port terminals $C_1$ and $C_2$. A winding 14 extends from the center tap of winding 12 to a point of reference potential illustrated as ground. A winding 16 is inductively coupled to winding 14 and has one end connected to ground while the opposite end is connected to a sum port denoted by terminal S. A fourth winding 18 is inductively coupled to the center tap winding 12 and has one end connected to ground while its opposite end is terminated in a difference port denoted by terminal D. A pair of transceivers 20 and 22 adapted to operate at frequencies $f_1$ and $f_2$, respectively, are coupled to the difference and sum ports D and S while the first conjugate port, i.e. terminal $C_1$ is coupled to a common antenna 24 for the transceivers 20 and 22. A broadband impedance simulator 26 is coupled to the other conjugate port which is denoted as terminal $C_2$. The system is adapted to operate as follows. When transceiver 20 is transmitting at frequency $f_1$, and the impedance exhibited by the simulator 26 and the antenna 24 are equal, the power coupled to the hybrid transformer 10 divides equally between the antenna and the simulator. The system being balanced under these conditions, none of the transmitted power from the transceiver 20 reaches the second transceiver 22 and therefore the two transceivers are considered to be electrically isolated or decoupled from each other at the frequency $f_1$.

In a like manner when transceiver 22 is transmitting on frequency $f_2$ and the impedances of the simulator 26 and the antenna 24 are substantially equal, the power then divides equally between the antenna and the simulator and the transceivers are again electrically decoupled from each other at the frequency $f_2$. The two transceivers 20 and 22, therefore, can operate simultaneously on frequencies $f_1$ and $f_2$.

The configuration shown in FIG. 1 is limited in its application to the frequency differences between $f_1$ and $f_2$ in that the impedance simulator 26 must be broadbanded to match the antenna impedance at both operating frequencies. In order to alleviate the necessity for broadbanding the impedance simulator, the embodiment shown in FIG. 2 may when desirable be resorted to. In this instance, two impedance simulators 28 and 30 are connected in parallel to the conjugate port $C_2$ through respective filter networks 32 and 34. Impedance simulator 28 is adapted to match the impedance of the antenna 24 at the operating frequency $f_1$, while the simulator 30 is adapted to match the impedance of the antenna at the frequency $f_2$. The filter network 32 is comprised of a parallel combination of an inductor 36 and a capacitor 38 connected to a series capacitor 40 and exhibits a frequency response which passes the frequency $f_1$ while rejecting the frequency $f_2$. The filter network 34, on the other hand, is adapted to pass the frequency $f_2$, while rejecting the frequency $f_1$ and comprises the parallel combination of inductor 42 and capacitor 44 connected to a series inductance 46. The frequency responses of both filters 32 and 34 are furthermore depicted by the curves 48 and 50 which illustrate the respective variations of reactance with respect to frequency.

Figure 2:
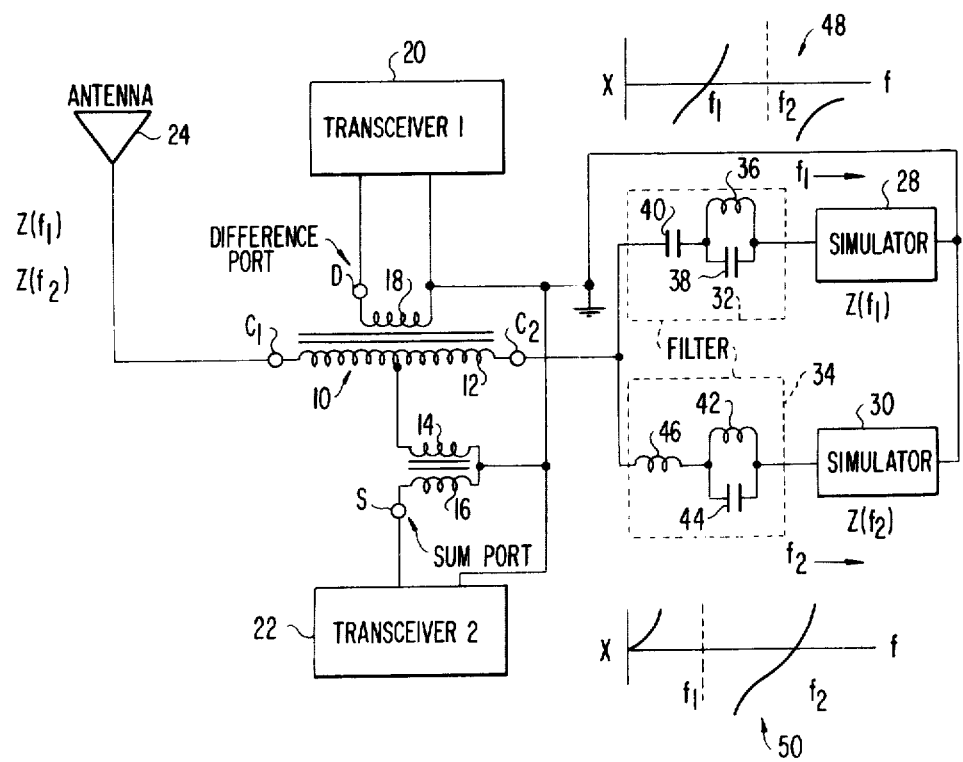
FIG. 2 is a circuit block diagram illustrative of a second embodiment of the subject invention.

With respect to the system shown in FIG. 2, when transceiver 20 is transmitting on frequency $f_1$, the power divides equally between the antenna 24 and the impedance simulator 28. The filter network 32 passes radio signals at frequency $f_1$ while attenuating or rejecting signals at $f_2$. On the other hand, when transceiver 22 is transmitting, the power divides equally between the antenna 24 and the impedance simulator 30 with the filter network 34 passing radio signals at $f_2$ while attenuating or rejecting signals at $f_1$.

Figure 4:
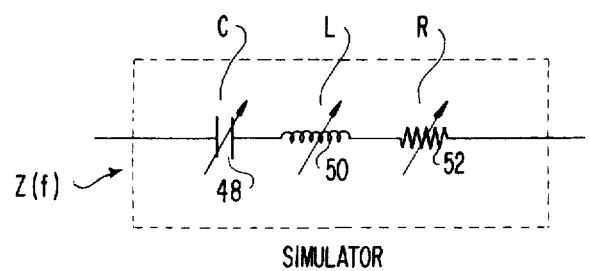
FIG. 4 is an electrical schematic diagram illustrative of impedance simulator means utilized in conjunction with the subject invention.

The impedance simulators 28 and 30 are illustratively shown in FIG. 4 as being comprised of a combination of a variable capacitor 48, a variable inductance 50, and a variable resistance 52 connected in series circuit relationship so that the proper frequency selectively can easily be accomplished. The inductors and capacitors included in the filter networks 32 and 34, moreover, can also be made adjustable so as to facilitate tuning them to the appropriate operating frequencies of the respective transceivers. The filter networks 32 and 34 are not meant to be interpreted in a limiting sense, since those skilled in the science of filter design can, when desirable, devise other filters well suited to the system for the purpose of channeling the radio signals to the appropriate impedance simulator.

Thus the system as shown in FIG. 2 is adapted to operate at any two radio frequencies within the operating band of the antenna 24 and the hybrid transformer 10. Some types of antennas, for example, cover broad frequency ranges by means of special electrical networks which are switched into the antenna circuit. If an antenna employing switched bands is used with the system shown in FIG. 2, it will be necessary for both transceivers 20 and 22 to operate at frequencies within the band to which the antenna is switched.

Figure 3:
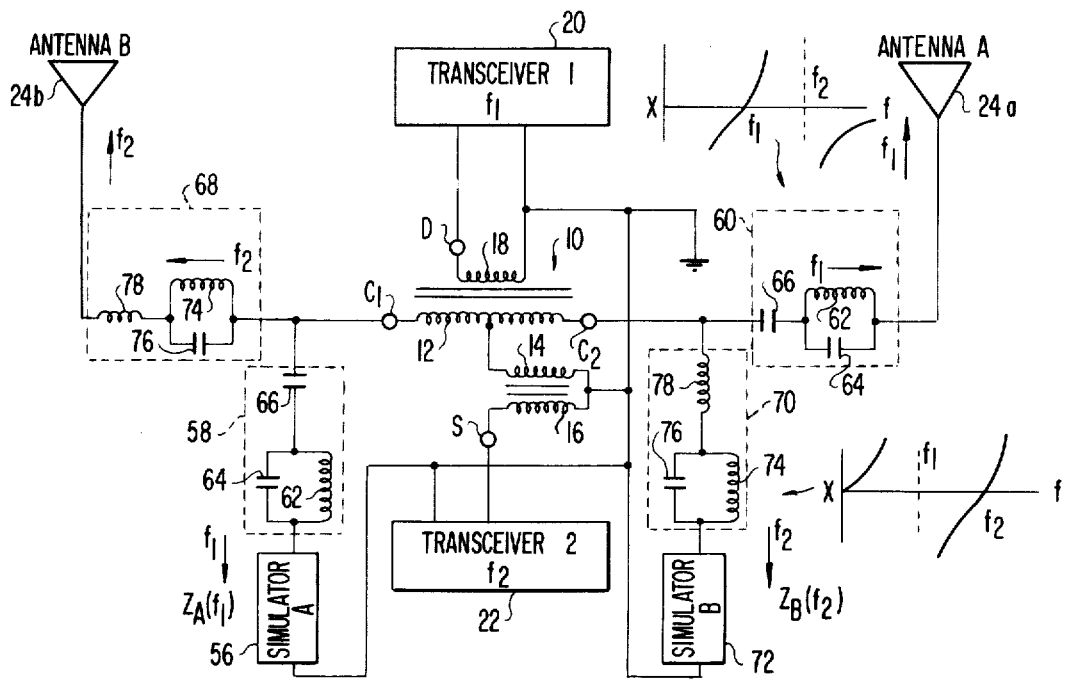
FIG. 3 is a circuit block diagram illustrative of a third embodiment of the subject invention.

Referring now to the embodiment shown in FIG. 3, the transceivers 20 and 22 are adapted to operate with separate antennas $24_a$ and $24_b$ through the common hybrid transformer 10. The transceiver 20 operating at frequency $f_1$ is adapted to operate with antenna $24_a$ while the transceiver 22 is adapted to operate with antenna $24_b$. An impedance simulator 56 for matching the impedance of antenna $24a$ tuned to frequency $f_1$ is coupled to conjugate port terminal $C_1$ through a first filter network 58 which is adapted to pass the frequency $f_1$ while rejecting frequency $f_2$ while a second filter network 60 having the same filter characteristics as filter network 58, i.e. adapted to pass the frequency $f_1$ while rejecting the frequency $f_2$ is coupled between the antenna $24_a$ and the other conjugate port terminal $C_2$. Both filter networks 58 and 60 are configured alike and being comprised of the parallel inductance 62 and capacitances 64 connected in series to a capacitor 66.

The antenna $24_b$ tuned to the frequency $f_2$ is coupled to the conjugate port terminal $C_1$ through a filter network 68 adapted to pass the operating frequency $f_2$ while rejecting the frequency $f_1$, while a second like filter network 70 is coupled between the conjugate port terminal $C_2$ and an impedance simulator 72 which is adapted to match the impedance of antenna $24_b$. As in the case of the filter networks 58 and 60, the filters 68 and 70 are alike in frequency characteristic and being comprised of the parallel combination of an inductance 74 and capacitor 76 series connected to an inductance 78.

The system shown in FIG. 3 operates as follows. The frequency selective filters 58 and 60 pass radio frequencies at the operating frequency $f_1$, while rejecting signals at frequency $f_2$. In a like manner, the filter networks 68 and 70 pass radio signals at the frequency $f_2$ and reject signals at frequency $f_1$. Thus when transceiver 20 is transmitting on frequency $f_1$, the power splits equally between antenna $24_a$ and the impedance simulator network 56. Similarly, when transceiver 22 transmits on frequency $f_2$, the power splits equally between antenna $24_b$ and impedance simulator network 72.

In the system shown in FIG. 3, the antennas $24_a$ and $24_b$ need not be identical. In fact, the antennas can be completely different types, one for example can be a narrow band type while the other can be a broadband type. Also, when antenna $24_b$ is transmitting on frequency $f_2$, very little radiation interaction occurs with antenna $24_a$. This follows because the networks connected to antenna $24_a$ when viewed from the antenna terminals rejects radio frequency signals at frequency $f_2$. Thus, in most cases, antenna $24_a$ will sustain very small parasitic currents when antenna $24_b$ is transmitting and therefore the radiation pattern of antenna $24_a$ should not be adversely affected. Similarly, there should be very little radiation interaction between the antennas when antenna $24_b$ is transmitting.

The simulator network shown in FIG. 4 is merely illustrative of a simple type of impedance simulator which may be utilized in connection with the embodiments disclosed. It is important to note, however, that the component parts of the impedance simulator must withstand the transmitter power or at least half of the rated power inasmuch as the hybrid transformer 10 couples half of the power to the simulator which is dissipated as heat in the resistive component 52 of the simulator network shown in FIG. 4. In radio systems where the power is small, for example 10 watts or less, it will be easy to obtain a suitable resistor for this purpose. Also, the heat given off by the resistor which might otherwise be wasted, may be used to warm some other piece of equipment. It should be pointed out that the series circuit configuration shown in FIG. 4 is disclosed by way of illustration only, and is not meant to be considered in a limiting sense, since other networks can obviously be devised to suit the specific requirements of the application intended. Other forms and modifications may also be reported to without departing from the spirit and scope of the invention as set forth in the following claims.

Having thus shown and described what is at present considered to be the preferred embodiments of the subject invention, 1 claim:

1. A system for permitting simultaneous transmission and reception of two colocated transceivers operating on different frequencies without mutual interference therebetween, comprising in combination:
  a single hybrid transformer having a sum port, a difference port, and first and second conjugate ports;
  means continuously coupling one of said two transceivers operating at a first frequency to said sum port;
  means continuously coupling the other of said two transceivers operating at a second frequency to said difference port;
  antenna means coupled to said first conjugate port and having first and second predetermined operating impedance characteristics dependent upon the different predetermined operating frequency of each of said two tranceivers; and
  electrical load impedance means continuously coupled to said second conjugate port and being operative to substantially simulate said first and second operating impedance characteristics of said antenna means at both of said frequencies simultaneously whereby power couple to said sum and difference ports at each of said operating frequencies is substantially equally divided between said antenna means and said electrical load impedance means coupled to said two conjugate ports.

2. The system as defined by claim 1 wherein said electrical load impedance means comprises broadband circuit means substantially simulating the impedance characteristics of said antenna means operating at said operating frequencies of both said transceivers.

3. The system as defined by claim 1 wherein said electrical impedance circuit means for simulating the impedance characteristic of said antenna means comprises an interconnected variable capacitor, a variable inductor, and a variable resistance.

4. The system as defined by claim 1 wherein said electrical load impedance means comprises first circuit means simulating the impedance characteristic of said antenna means operating at the operating frequency of said one transceiver, and second circuit means, coupled in parallel to said first circuit means, substantially simulating the impedance characteristic of said antenna means operating at the operating frequency of said other transceiver.

5. The system as defined by claim 4 and additionally including a first filter network coupled between said first circuit means and said first conjugate port and having a frequency characteristic adapted to pass the operating frequency of said one transceiver while rejecting the operating frequency of said other transceiver; and
  a second filter network coupled between said first conjugate port and said second circuit means and having a frequency characteristic adapted to pass the operating frequency of said other transceiver while rejecting the operating frequency of said one transceiver.

6. The system as defined by claim 1 and additionally including another antenna means coupled to said second conjugate port whereby said antenna means coupled to said first conjugate port has an impedance characteristic for operating at the operating frequency $f_1$ of said one transceiver while said another antenna means coupled to said second conjugate port has an impedance characteristic for operating at the operating frequency $f_2$ of said other transceiver; and
  another electrical load impedance circuit means coupled to said first conjugate port and being operative to substantially simulate the impedance characteristic of said antenna means coupled to said second conjugate port.

7. The system as defined by claim 6 and additionally including a first filter network coupled between said second conjugate port and said electrical load impedance means coupled to said second conjugate port and being operative to pass the operating frequency $f_2$ of said other transceiver while rejecting the operating frequency $f_1$ of said one transceiver, and a second filter network coupled between said first conjugate port and the electrical impedance circuit means coupled to said first conjugate port and being operative to pass the operating frequency $f_1$ of said one transceiver while rejecting the operating frequency $f_2$ of said other transceiver.

8. The system as defined by claim 7 and additionally including a third filter network coupled between said first conjugate port and said antenna means coupled to said first conjugate port and being adapted to pass the operating frequency $f_2$ of said other transceiver while rejecting the operating frequency $f_1$ of said one transceiver, and a fourth filter network coupled between said second conjugate port and said antenna means coupled to said second conjugate port and being adapted to pass the operating frequency $f_1$ of said one transceiver while rejecting the frequency $f_2$ of said other transceiver.

9. The system as defined by claim 8 wherein said first and third filter network are comprised of a like parallel combination of first and second type electrical reactances connected in series to a reactance of a first type and wherein said second and third filter network are comprised of a like parallel combination of a first and second type electrical reactance connected in series to a second type of electrical reactance.

10. The system as defined by claim 9 wherein said reactance of a first type is inductive and said reactance of a second type is capacitive.

* * * * *